United States Patent [19]
Müller

[11] Patent Number: 5,638,665
[45] Date of Patent: Jun. 17, 1997

[54] SPACING CONVEYOR MECHANISM

[75] Inventor: Rolf Müller, Mehring, Germany

[73] Assignee: Riverwood International Corporation, Atlanta, Ga.

[21] Appl. No.: 545,898

[22] Filed: Oct. 20, 1995

[30] Foreign Application Priority Data

Oct. 20, 1994 [GB] United Kingdom ............ 9421195

[51] Int. Cl.⁶ .................................. B65B 35/30
[52] U.S. Cl. ...................... 53/543; 53/48.7; 53/531; 198/419.3; 198/604; 198/797
[58] Field of Search ................. 53/48.7, 251, 252, 53/534, 531, 542, 543; 198/419.2, 419.3, 626.1, 626.5, 604, 797, 798, 799

[56] References Cited

U.S. PATENT DOCUMENTS

| | | | |
|---|---|---|---|
| 3,402,803 | 9/1968 | Griner | 198/419.2 |
| 3,648,431 | 3/1972 | Hartbauer et al. | 53/542 X |
| 4,078,357 | 3/1978 | Ida | 53/48.1 X |
| 4,100,715 | 7/1978 | Ganz | 53/48.7 |
| 4,591,043 | 5/1986 | Muller | 198/626.1 X |
| 5,012,916 | 5/1991 | Cruver | 198/419.2 X |
| 5,161,664 | 11/1992 | Le Bras | 198/419.3 |

FOREIGN PATENT DOCUMENTS

| | | |
|---|---|---|
| 0 450 915 | 10/1991 | European Pat. Off. . |
| 2 701 695 | 8/1994 | France . |
| 25 56 337 | 6/1977 | Germany . |

*Primary Examiner*—Daniel Moon
*Attorney, Agent, or Firm*—Isaf, Vaughan & Kerr

[57] ABSTRACT

There is provided an article conveyor mechanism comprising a drive chain 13 on which is pivotally mounted a number of carriages 16 each having a conveyor 17 secured thereto. Each conveyor 17 has a plurality of pockets 18. Each conveyor 16 has two pins 19, 20 for engaging in respective grooves 21, 22 which are identical to each other in shape, but which are offset. When the chain 13 is driven, the conveyors remain parallel to each other throughout their endless paths.

11 Claims, 3 Drawing Sheets

SPACING CONVEYOR MECHANISM

BACKGROUND OF THE INVENTION

This invention relates to spacing conveyor mechanisms for article packaging machines and in particular but not exclusively for can or bottle multi-pack packaging machines.

SUMMARY OF THE INVENTION

According to a first aspect of the present invention there is provided a spacing conveyor mechanism for an article packaging machine having an article feed path, said mechanism comprising a number of article conveyors mounted on an endless drive for movement in a circuitous path a part of which is in use adjacent the feed path of the articles and during which part of its path each conveyor engages articles in the feed path, each conveyor comprising a carriage pivotally attached to the endless drive and an article engaging member attached to the carriage, each carriage having two or more followers each for cooperation with a guide means, the two or more guide means being of the same shape to each other but offset such that the carriages remain substantially parallel to each other throughout their circuitous paths.

Preferably said path of the conveyor adjacent the feed path is substantially straight. Conveniently two of said guide means are provided in the form of tracks each having two straight sections jointed by semi circular ends, one of said straight sections effecting the movement of the conveyors adjacent the feed path.

In some embodiments each article engaging member has a number of recessed pockets each for an article and also each article engaging member is removably attached to its associated carriage. In further preferred embodiments the carriages are pivotally attachable at any location along the length of the drive which is preferably a chain. In normal embodiments the carriages are equispaced along the length of the chain.

Preferably the guide tracks are offset such that the straight sections are offset in both lateral and lengthwise directions. In certain embodiments the guide tracks are formed as grooves in a plastics member disposed above the single chain. Also, the guide tracks are superimposed on each other and cross each other at two locations.

According to a second aspect of the present invention there is provided a spacing conveyor arrangement comprising two such spacing conveyor mechanisms located parallel to each other on either side of adjacent article feed paths, each set of article conveyors engaging separate lines of articles.

An embodiment of the present invention will now be described in more detail. The description makes reference to the accompanying drawings.

DETAILED DESCRIPTION

Figure 1:
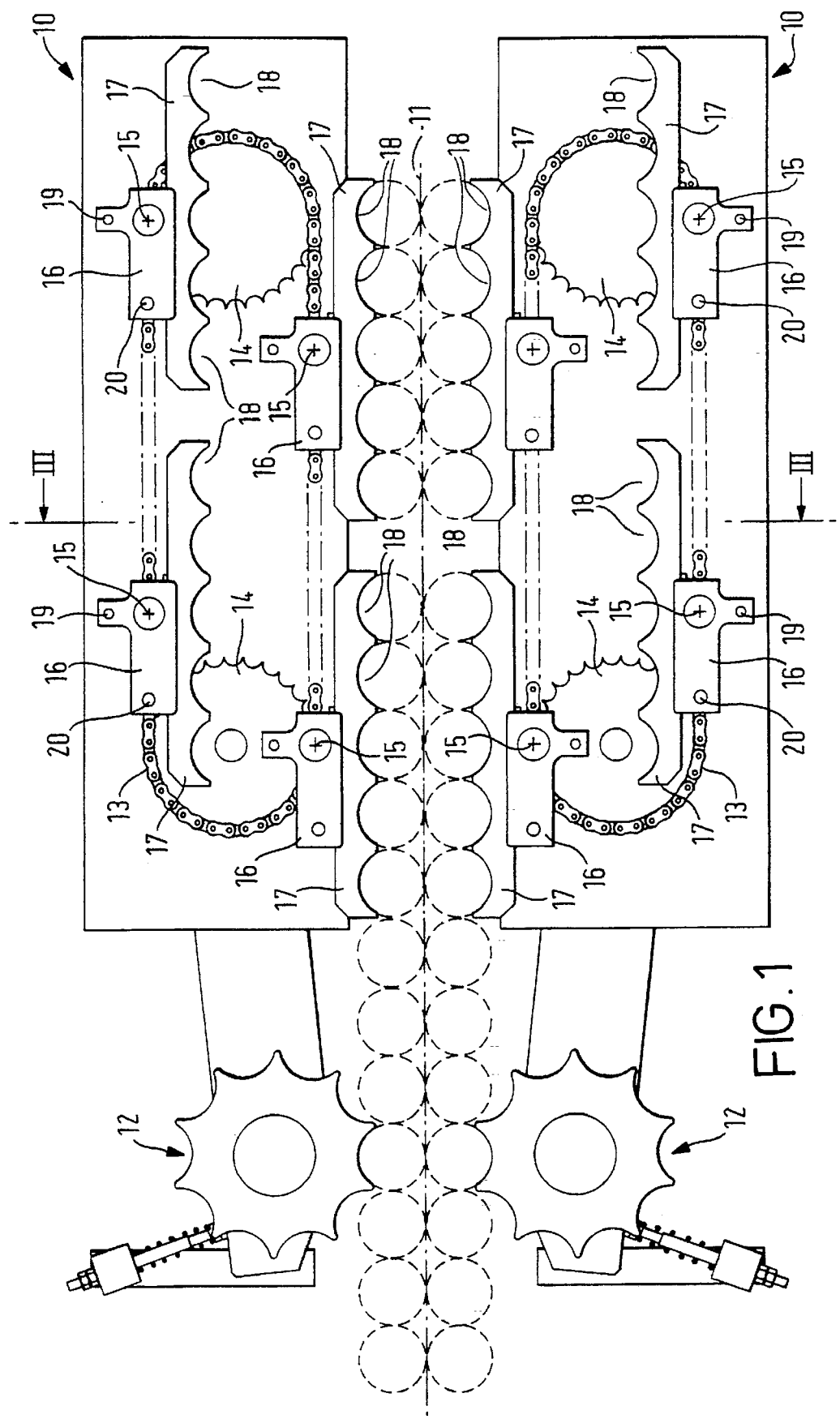
FIG. 1 is a schematic view from above of a spacing conveyor mechanism according to the invention, excluding a cover member.
Figure 2:
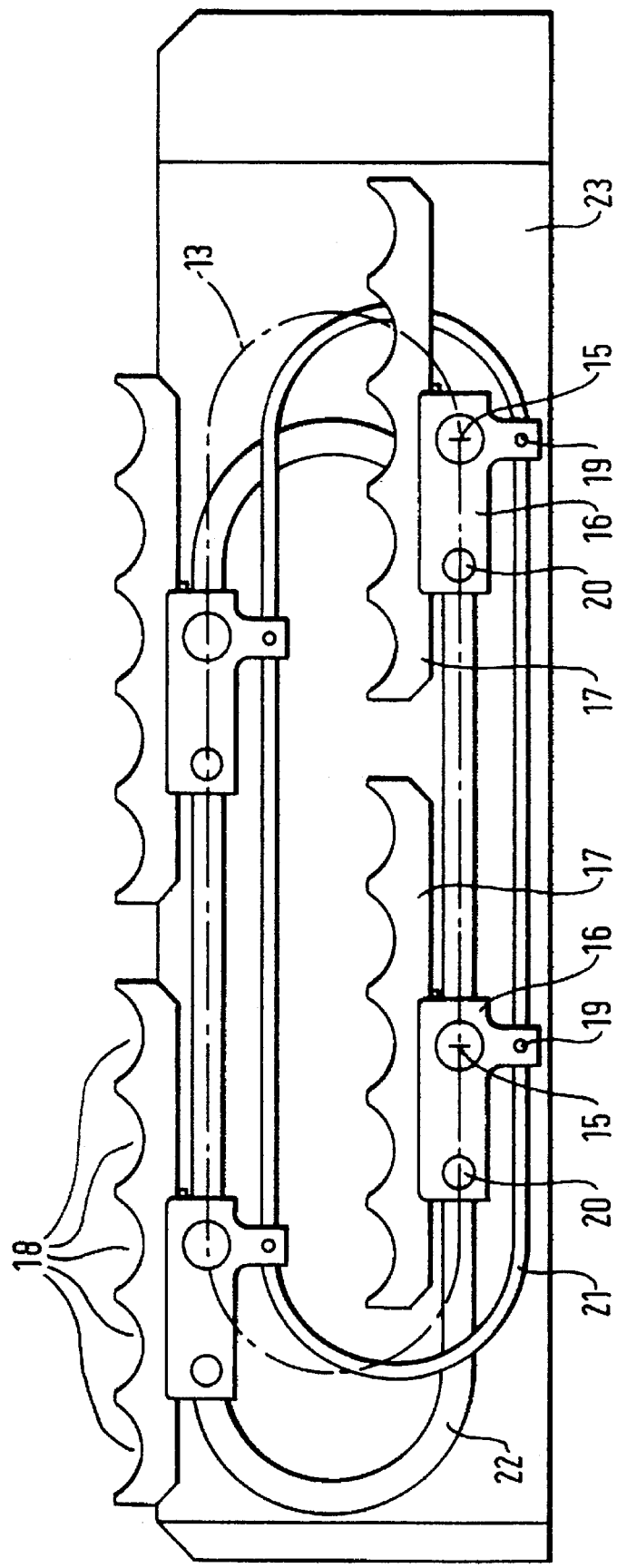
FIG. 2 is a schematic view from below of part of the spacing conveyor mechanism shown in FIG. 1.
Figure 3:
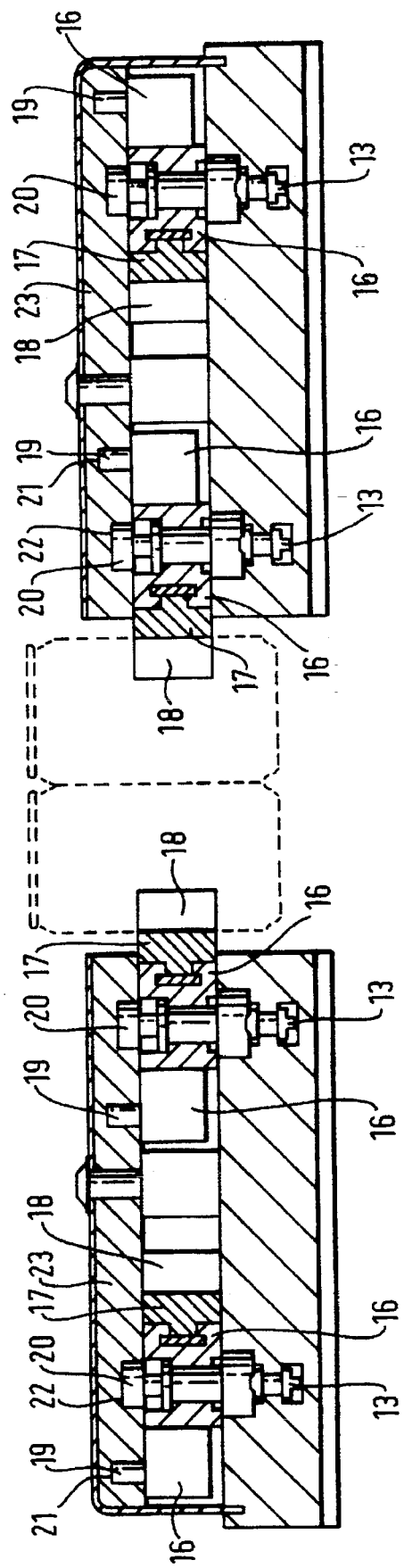
FIG. 3 is a schematic section through the mechanism on line III—III of FIG. 1.

In the figures there is shown a spacing conveyor mechanism 10 for a packaging machine. The embodiment shown is for spacing and conveying multiples of cans or bottles. The mechanism 10 is, in use, positioned adjacent a feed path 11 defined by a moving belt, for example, which conveys the cans or bottles in groups to an area (not shown) where they are automatically packed into boxes, sleeves etc. A feed mechanism 12 which may be in the form of a star wheel arrangement feeds cans or bottles to the mechanism 10 at a rate equal to the rate required. The mechanism groups the cans or bottles on to a conveyor means, such as the moving belt, which transports the groups to the packing section of the packaging machine. Quite frequently a similar mechanism 10 will be provided in parallel so as to space and convey articles in one or two rows, the moving belt having space for said row or rows of articles to pass between the two mechanisms 10.

Each mechanism 10 comprises a drive chain 13 which is positioned in a horizontal plane between two sprockets 14. Pivotally connected to the chain at equally spaced locations 15 are carriages 16 each carrying a conveyor 17. The conveyors have a number of recessed pockets 18 for receiving a chosen number of individual bottles or cans which number of course determines the sizes of the multipacks being produced.

In the embodiment shown there are five pockets 18 in each of four conveyors 17 so that for every full revolution of the chain 13, twenty cans will be moved to the packing area in groups of five. Similarly the star wheel 12 will feed twenty cans to the mechanism 10 in the same time period. The drives of the star wheel and the chain 13 can be the same or separate drives could be used as long as they are controlled so as to work on the same number of cans in a given time period.

To ensure smooth movement of the cans through the mechanism 10, it is important that the conveyors 17 approach and separate from the cans substantially parallel to the feed path 11. The conveyors 17 and carriages 16 are, therefore, kept parallel to each other all the time and in particular as they approach the cans and separate from the cans.

In order to keep the carriages 16 and thus the conveyors 17 parallel, each carriage is provided with two upwardly projecting, spaced pins 19, 20. The pins 19, 20 are spaced from the pivotal connection 15 of the carriage 16 and the chain 13 and the pins 19, 20 are not in straight alignment with the connection 15. Each pin 19, 20 engages in its own guide track 21, 22 formed in a plastics cover member 23 located above the chain 13. The two guide tracks 21,22 are of identical shape and length and are offset by the same amount and in the same directions as are the two pins 19, 20 one from another. As the carriages 16 are driven in their circuitous path by the chain 13 the carriages 16 and conveyors 17 remain parallel to each other throughout, by virtue of the identical placement of the pins 19, 20 on the carriages, the identical offset guide tracks and the pivotal connections of the carriages on the chain. One set of pins 20 are larger in diameter than the other set of pins 19 and therefore the width of guide track 22 is greater than that of guide track 21. The pins 19, 20 could, however, be of identical size or reversed.

It will be apparent that other arrangements are of course possible. For example the chain could be replaced by other endless drive means or it may follow a more complex path than that shown. The pitch of the mechanism could be changed by providing more or less carriages/conveyors and the conveyors could be changed so as to provide pockets for any number of cans/bottles. Changes in the relative speeds of the star wheel and the chain may however be required.

The pin arrangement shown has been found to be particularly suitable, but others are possible. The guide tracks could even be offset only in the lengthwise or lateral directions if desired provided the pin placements reflected such changes. Further guide tracks/pins could be provided, but may cause difficulties in operating the mechanism as smoothly as desired.

While a preferred embodiment of the invention has been disclosed in the foregoing specification and drawings, it will be understood by those skilled in the art that variations and modifications thereof can be made without departure from the spirit and scope of the invention as set forth in the following claims.

I claim:

1. A spacing conveyor mechanism for an article packaging machine, the packaging machine having an article feed path along which a series of articles are advanced in an article flow direction, each article having a substantially rigid outer periphery, said spacing conveyor mechanism comprising:

a first series of carriages including means for pivotally mounting said carriages on a first endless drive for movement in a first circuitous path, wherein a first portion of the first circuitous path is disposed adjacent the feed path of the articles;

an article engaging member rigidly attached to each said carriage within said first series of carriages, each said article engaging member including at least two depressions which are complementary in shape to the respective outer peripheries of the articles on the feed path, wherein said depressions simultaneously engage the articles laterally with respect to the feed path when said article engaging member is located at said first portion of the first circuitous path, thereby forming a preconfigured group of articles; and at least two followers mounted to each said carriage for cooperation with a first guide means, wherein said followers are separate from said carriage mounting means;

said first guide means including a first set of guide tracks including at least two guide tracks, wherein each said guide track receives a single follower from each said carriage to form follower-guide track pairs, and said first set of tracks are separated from each other and from the circuitous path, and wherein each said guide track is substantially identical in shape to said circuitous path such that the carriages within the first carriage set remain substantially parallel to each other along said first circuitous path;

and wherein said followers are sufficiently offset from one another so as to require the guide tracks within said first set of guide tracks to intersect one another at two locations;

whereby said spacing conveyor mechanism groups the articles adjacent one another on the feed path into a series of spaced and preconfigured groups of articles as the articles advance along the article feed path in the article flow direction.

2. The mechanism as claimed in claim 1 wherein two articles are disposed abreast to form two article columns along the article path, said mechanism further comprising:

a second series of carriages pivotally mounted on a second endless drive for movement in a second circuitous path, wherein a first portion of the second circuitous path is disposed adjacent the feed path of the articles and opposite the first circuitous path such that the feed path is disposed between the first portions of the first and second circuitous paths and;

an article engaging member rigidly attached to each said carriage within said second series of carriages;

second guide means including a second set of guide tracks including at least two guide tracks, wherein said guide tracks within said second guide track set are offset from each other and from the second circuitous path, and wherein each said guide track in said second guide track set is substantially identical in shape to said second circuitous path such that the carriages within the second carriage set remain substantially parallel to each other along said second circuitous path;

wherein said first portions of said first and second circuitous paths are disposed parallel to one another on laterally opposed sides of the article feed path;

and wherein said depressions on said article engaging members simultaneously engage articles from opposite lateral sides of the feed path when said article engaging members on said first and second endless drive means are located at said first portions of the first and second circuitous paths, respectively, thereby forming a preconfigured group of articles into a two column configuration.

3. The mechanism as claimed in claim 1 further including a feed mechanism disposed adjacent the feed path and immediately upstream of said first endless drive with respect to the article flow, said feed mechanism comprising:

a feed member including a plurality of depressions disposed radially around a center portion of said feed member, said depressions being complementary to the articles on the feed path;

means for rotating said feed member, wherein said feed member depressions engage the articles along the feed path and feed the articles downstream to said article engaging members.

4. The mechanism as claimed in claim 1 wherein each article engaging member is removably attached to an associated carriage.

5. The mechanism as claimed in claim 1 wherein said first endless drive comprises a chain, and wherein the carriages within said first set of carriages are each pivotally attachable at any location on said first endless drive.

6. A mechanism as claimed in claim 5 wherein the carriages are equispaced along the length of the chain.

7. The mechanism as claimed in claim 1 wherein said first portion of the first circuitous path adjacent the feed path includes a substantially straight section.

8. The mechanism as claimed in claim 2 wherein said first set of guide tracks are formed as grooves in a cover member disposed above said first endless drive.

9. The mechanism as claimed in claim 8 wherein said guide tracks within said first set of guide tracks are superimposed on each other.

10. The mechanism as claimed in claim 7 wherein said first set of guide tracks each include straight sections joined by semi-circular ends, wherein one of said straight sections effects movement of the carriages within the first carriage set adjacent the feed path.

11. The mechanism as claimed in claim 10 wherein said first set of guide tracks are separated from one another such that said straight sections of the guide tracks are offset in both lateral and article flow directions with respect to said feed path.

* * * * *